United States Patent
Meek et al.

(10) Patent No.: US 8,739,118 B2
(45) Date of Patent: May 27, 2014

(54) PRAGMATIC MAPPING SPECIFICATION, COMPILATION AND VALIDATION

(75) Inventors: Colin James Meek, Redmond, WA (US); Diego Bernardo Vega, Sammamish, WA (US); Alexander Douglas James, Sammamish, WA (US); Christopher L. Anderson, Redmond, WA (US); Srikanth Mandadi, Redmond, WA (US); Simon Cavanagh, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 439 days.

(21) Appl. No.: 12/756,903

(22) Filed: Apr. 8, 2010

(65) Prior Publication Data

US 2011/0252282 A1    Oct. 13, 2011

(51) Int. Cl.
*G06F 9/44* (2006.01)

(52) U.S. Cl.
USPC .............................. 717/108; 717/104; 717/116

(58) Field of Classification Search
None
See application file for complete search history.

(56) References Cited

U.S. PATENT DOCUMENTS

| | | | |
|---|---|---|---|
| 5,193,171 A | 3/1993 | Shinmura | |
| 5,500,881 A | 3/1996 | Levin et al. | |
| 5,504,885 A | 4/1996 | Alashqur | |
| 5,615,362 A | 3/1997 | Jensen et al. | |
| 5,664,180 A | 9/1997 | Halpert et al. | |
| 5,748,966 A | 5/1998 | Sato | |
| 5,761,493 A | 6/1998 | Blakeley et al. | |
| 5,857,180 A | 1/1999 | Hallmark | |
| 5,897,622 A | 4/1999 | Blinn et al. | |
| 5,907,846 A | 5/1999 | Berner et al. | |
| 5,937,402 A | 8/1999 | Pandit | |
| 5,937,409 A | 8/1999 | Wetherbee | |
| 5,956,725 A * | 9/1999 | Burroughs et al. | 717/108 |
| 6,016,497 A | 1/2000 | Suver | |
| 6,101,502 A | 8/2000 | Heubner et al. | |
| 6,134,540 A | 10/2000 | Carey | |
| 6,148,296 A | 11/2000 | Tabbara | |
| 6,163,776 A | 12/2000 | Periwal | |
| 6,243,709 B1 | 6/2001 | Tung | |
| 6,339,775 B1 | 1/2002 | Zamanian et al. | |
| 6,378,126 B2 | 4/2002 | Tang | |
| 6,470,354 B1 | 10/2002 | Aldridge et al. | |
| 6,567,819 B1 | 5/2003 | Cheng et al. | |
| 6,574,673 B1 | 6/2003 | Hari | |
| 6,615,323 B1 | 9/2003 | Petersen et al. | |

(Continued)

OTHER PUBLICATIONS

Adya et al., "Anatomy of the ADO.NET Entity Framework", 2007 ACM, pp. 877-888; <http://dl.acm.org/citation.cfm?doid=1247480.1247580>.*

(Continued)

*Primary Examiner* — Thuy Dao
*Assistant Examiner* — Ben C Wang
(74) *Attorney, Agent, or Firm* — Nicholas Chen; David Andrews; Micky Minhas (57) ABSTRACT

Facilitating translation of data between object oriented programs and database storage tables. A method includes receiving user input from a user. The user input includes a plurality of parts. Each part includes a specification of a source (such as a type source), optionally a filter, and a projection. Each projection assigns values to table columns. Based on the plurality of parts received, the method includes generating one or more views. The one or more views describe relationships between model extents and database tables.

19 Claims, 2 Drawing Sheets

(56) References Cited

U.S. PATENT DOCUMENTS

| | | | |
|---|---|---|---|
| 6,625,620 | B1 | 9/2003 | Tagg |
| 6,690,981 | B1 | 2/2004 | Kawachi et al. |
| 6,754,670 | B1 * | 6/2004 | Lindsay et al. ............ 707/999.1 |
| 6,857,118 | B2 | 2/2005 | Karr et al. |
| 6,985,912 | B2 | 1/2006 | Mullins et al. |
| 6,993,529 | B1 | 1/2006 | Basko et al. |
| 7,043,720 | B2 | 5/2006 | Kuzmin |
| 7,047,518 | B2 * | 5/2006 | Little et al. .................... 717/108 |
| 7,096,231 | B2 | 8/2006 | Rajak et al. |
| 7,103,590 | B1 | 9/2006 | Murthy et al. |
| 7,137,100 | B2 | 11/2006 | Iborra et al. |
| 7,185,016 | B1 | 2/2007 | Rasmussen |
| 7,197,747 | B2 | 3/2007 | Ishizaki et al. |
| 7,284,242 | B2 | 10/2007 | Vion-Dury |
| 7,289,997 | B1 | 10/2007 | Kita et al. |
| 7,290,018 | B2 | 10/2007 | Muecklich |
| 7,296,028 | B1 * | 11/2007 | Ivanova .................... 707/999.1 |
| 7,310,638 | B1 | 12/2007 | Blair |
| 7,512,633 | B2 * | 3/2009 | Cohen et al. ................. 717/116 |
| 7,603,378 | B2 * | 10/2009 | Ivanova ........................ 717/116 |
| 7,788,275 | B2 * | 8/2010 | Warren et al. ................. 707/763 |
| 7,945,604 | B2 * | 5/2011 | Wang et al. ................... 707/803 |
| 8,024,701 | B2 * | 9/2011 | Cote ............................. 717/108 |
| 8,086,560 | B2 * | 12/2011 | Hernandez-Sherrington et al. ......... 707/601 |
| 2002/0194155 | A1 | 12/2002 | Aldridge et al. |
| 2003/0061244 | A1 | 3/2003 | Hiroshata |
| 2003/0208505 | A1 | 11/2003 | Mullins et al. |
| 2003/0212705 | A1 * | 11/2003 | Williamson et al. ...... 707/103 R |
| 2004/0098384 | A1 | 5/2004 | Min et al. |
| 2004/0148592 | A1 | 7/2004 | Vion-Dury |
| 2004/0158549 | A1 | 8/2004 | Matena et al. |
| 2004/0194057 | A1 | 9/2004 | Schulte et al. |
| 2004/0210828 | A1 | 10/2004 | Langer |
| 2004/0230584 | A1 | 11/2004 | Nouri |
| 2004/0243921 | A1 | 12/2004 | Carr et al. |
| 2004/0260691 | A1 | 12/2004 | Desai et al. |
| 2004/0268328 | A1 | 12/2004 | Plesko et al. |
| 2005/0027681 | A1 | 2/2005 | Bernstein et al. |
| 2005/0055336 | A1 | 3/2005 | Hui et al. |
| 2005/0138073 | A1 | 6/2005 | Zhou et al. |
| 2006/0004855 | A1 * | 1/2006 | Ivanova et al. ............. 707/103 Y |
| 2006/0136452 | A1 * | 6/2006 | Lim et al. ...................... 707/101 |
| 2006/0143223 | A1 * | 6/2006 | Ivanova .................... 707/103 R |
| 2006/0179068 | A1 | 8/2006 | Warner et al. |
| 2006/0195476 | A1 | 8/2006 | Nori et al. |
| 2006/0200438 | A1 | 9/2006 | Schloming |
| 2006/0294059 | A1 | 12/2006 | Chamberlain et al. |
| 2007/0027849 | A1 | 2/2007 | Meijer |
| 2007/0027905 | A1 * | 2/2007 | Warren et al. ............. 707/103 R |
| 2007/0028222 | A1 | 2/2007 | Meijer |
| 2007/0028223 | A1 | 2/2007 | Meijer |
| 2007/0044083 | A1 | 2/2007 | Meijer |
| 2007/0067716 | A1 | 3/2007 | Jung et al. |
| 2007/0226196 | A1 | 9/2007 | Adya |
| 2007/0226203 | A1 | 9/2007 | Adya |
| 2008/0059841 | A1 * | 3/2008 | Bordawekar et al. ............ 714/38 |
| 2008/0228697 | A1 | 9/2008 | Adya |
| 2008/0244510 | A1 * | 10/2008 | Cote ............................. 717/108 |
| 2009/0063555 | A1 | 3/2009 | Fisher |
| 2009/0077119 | A1 * | 3/2009 | Speth et al. .................... 717/104 |
| 2009/0172633 | A1 * | 7/2009 | Tsyganskiy et al. .......... 717/104 |

OTHER PUBLICATIONS

Bernstein, "Implementing Mapping Composition", 2007 Springer-Verlag, pp. 333-353; <http://link.springer.com/article/10.1007%Fs00778-007-0059-9>.*

Cabibbo et al., "Managing Inheritance Hierarchies in Object-Relational Mapping Tools", Springer-Verlag Berlin Heidelberg 2005, CAiSE 2005, LNCS 3520, pp. 135-150; <http://link.springer.com/content/pdf/10.1007%2F11431855_11>.*

Kowark et al., "Object-Relational Mapping with SqueakSave", 2009 ACM, IWST'09 Aug. 31, 2009, Brest, France, pp. 87-100; <http://dl.acm.org/citation.cfm?id=1735935.1735951&coll=DL&dl=GUIDE&CFID=163724587&CFTOKEN=55818809>.*

Peng et al., "An Enterprise Flexible Object-Relational Mapping Framework based on Metadata and Property-Seperation Storage", 2010 IEEE, pp. 263-266; <http://ieeexplore.ieee.org/stamp/stamp.jsp?tp=&arnumber=5532170>.*

Karega Scott; Microsoft .NET Framework 3.5, ADO.NET Application Development—Published Date: Mar. 15, 2009 http://www.itexamprep.com/cn/microsoft/exam/70-561/200903/16-718.html.

Ioannis N. Athanasiadis, et al.; Domain object modeling with relational persistence for idiomatic OWL/RDF—Published Date: 2009 http://www.athanasiadis.info/pdf/papers/oopsla2009.pdf.

Author Unknown; ODMG 3.0—Published Date: Oct. 21, 2007 http://www.service-architecture.com/database/articles/odmg_3_0.html.

Venkatesh Choppella, et al.; Constructing and Validating Entity-Relationship Data Models in the PVS Specification Language: A case study using a text-book example—Published Date: Apr. 11, 2006 http://www.iiitmk.ac.in/~choppell/papers/2006-iucs-tr632.pdf.

Melnik et al., "Compiling Mappings to Bridge Applications and Databases", Proceedings of the 2007 ACM SIGMOD International Conference on Management of Data; ACM New York, NY; Jun. 2007; pp. 461-472.

Abelson, et al., "Structure and Interpretation of Computer programs", The Rules of Evaluation [online], Cambridge, MA; The MIT Press 1996 [retrieved on Jan. 30, 2007]. Retrieved from the Internet: CURL: http:llmitpress.mit.edu/sicp/full-text/sicp/book/node56.html>, (chapter 3.2.1).

Barendregt, "The Impact of the Lambda Calculus and Computer Science", The Bulletin of Symbolic Logic [online], Jun. 1997 [retrieved on Jan. 30, 2007] Retrieved from the internet <UPL; http://www.mcs.vuw.ac.nz/courses/COMP432/2006T2/docs/BarMarnbda.pdf>.

Vieira et al., "Xverter: Querying XML Data with OR-DBMS", AMD 2003, Nov. 7, 2003, 8 pages, New Orleans, Louisiana.

Bonifati et al., "Pushing Reactive Services to XML Repositories Using Active Rules", ACM 2001, May 1, 2001, 9 pages, Hong Kong.

Sundaresan et al., "Algorithms and Programming Models for Efficient Representation of XML for Internet Applications", ACM 2001, May 1, 2001, 10 pages, Hong Kong.

Lajos Schrettner et al., "Parallel Execution of Object Functional Queries", Proceedings of the Fourth Symposium on Programming Languages and Software Tools, Hungary, Jun. 9-10, 1995.

Gupta et al., "Semantic-Based Filtering: Logic Programming Killer App" Available at least as early as Jul. 30, 2007.

Jones et al., "A Pattern Language for Language Implementation", Available at least as early as Jul. 30, 2007.

Brigit Demuth et al., "OCL as a Specification Language for Business Rules in Database Applications", Springer-Verlag Berlin Heidelberg Oct. 2001.

Orenstein et al., "Accessing a Relational Database through an object-Oriented Interface (extended abstract)", VLDB Conference 1995. (The month of Publication is irrelevant since the year of Publication is clearly prior to the filing of the Application).

Scheer et al., "Accelerating Your Object-Oriented Development", An Objectivity, Inc. White Paper. Lockhead-Martin Mission Systems, Aug. 2009.

Eshelman, "Standard Interface: An Object to Relational Mapping Interface to Relational Databases", TCL 2003/2004. AT&T Corp. (The month of Publication is irrelevant since the year of Publication is clearly prior to the filing of the Application).

Heil et al., "Concurrent Garbage Collection Using Hardware-Assisted Profiling", Proceedings of the 2nd International Symposium on Memory . . . , 2000—portal.acm.org (The month of Publication is irrelevant since the year of Publication is clearly prior to the filing of the Application).

Susan Urban et al., "An Object Query Object Interface to Relational Databases", IEEE Pub. 1994 (The month of Publication is irrelevant since the year of Publication is clearly prior to the filing of the Application).

C#: Overview of C# 3.0, Draft 2, Jul. 2005, 18 pages.

Burton, ".NET Common Language Runtime Unleashed", Chapter 14: Delegates and Events, Apr. 4, 2002, 3 pages.

(56) References Cited

OTHER PUBLICATIONS

Functional Programming. J. Webster (ed). Wiley Encyclopedia of Electrical and Electronics Engineering, 1999, John Wiley and Sons, Inc., 13 pages.

Appel, "A Standard ML Compiler", IN Functional Programming languages and Computer Architecture, 1987, Springer-Verlag pp. 301-324 Retrieved from http://citeseerx.ist.psu.edu/viewdoc/download;jsessionid=52E0B629682496E5BAD2886354FCBDB6?doi=1031.1.35.571&rep=rep1&type=pdf. Available at least as early as Apr. 21, 2008.

Ahmed et al., "Pro*C/C++ Precompiler Programmers Guide", Release 9.2 Copyright 1996, 2002 Oracle Corporation. Part No. A97269-01. Available at least as early as Dec. 15, 2008.

Jarvi et al., "The Lambda Library: Unarmed Functions in C++" Software—Practice and Experience, 2003, vol. 33, pp. 259-291. Retrieved from http://portal.acm.org/citation.cfm?id=779144. Available at least as early as Sep. 9, 2009.

McNamara et al., "Functional Programming in C++" Proceedings of the fifth ACM SIGPLAN International Conference on Functional Programming, 2000. pp. 118-129. Retrieved from http://portal.acm.org/citation.dfm?id=351251. Available at least as early as Sep. 9, 2009.

Wilcock et al., "Lambda Expressions and Closures for C++", Feb. 26, 2006,. ISO WG21, The C++ Standards Committee, Document No. N1968=06-0038. pp. 1-14. Retrieved from http://www.open-std.org/JTC1/SC22/WG21/docs/papers2006/n19683pdf.

SGI. "find-if", Jun. 8, 2000 Release 3.3 Standard Template Library, SGI.

Lischner, Ray, "C++ in a Nutshell, 1st Edition" sections 3.1 "L-values and R-values" and 5.3 "Function Overloading." May 2003.

Jarvi et al., "Chapter 5, Boost Lambda", boost.org, Boost Version 1.32.0, copyright Nov. 19, 2004. pp. 1-14. Retrieved from http://www.boost.org/doc/libs/1_32_0. Available at least as early as Sep. 9, 2009.

Gregor, Douglas, "Chapter 4. Boost Function", boost.org. Boost Version 1.32.0, copyright Nov. 14, 2004, pp. 1-14. Retrieved from http://www.boost.org/doc/libs/1_32_0. Available at least as early as Sep. 9, 2009.

U.S. Appl. No. 11/193,573, Aug. 2, 2007, Office Action.
U.S. Appl. No. 11/193,573, Nov. 29, 2007, Office Action.
U.S. Appl. No. 11/193,573, Apr. 29, 2008, Office Action.
U.S. Appl. No. 11/193,573, Oct. 31, 2008, Office Action.
U.S. Appl. No. 11/193,573, Jun. 8, 2009, Office Action.
U.S. Appl. No. 11/193,573, Oct. 23, 2009, Office Action.

\* cited by examiner

Figure 1

Figure 2

# PRAGMATIC MAPPING SPECIFICATION, COMPILATION AND VALIDATION

BACKGROUND

Background and Relevant Art

Computers and computing systems have affected nearly every aspect of modern living. Computers are generally involved in work, recreation, healthcare, transportation, entertainment, household management, etc.

Information used by computers may be generated and stored in disparate ways. For example, computer applications often operate on objects in object oriented computer systems. In contrast, data is often stored, not in object format, but rather in relational databases and their corresponding tables. Thus, for an application to operate on data stored in the database, a mapping between a relational database representation and an object representation may be used.

Several different mapping specifications have been used. Three such mapping specifications include Table per Hierarchy (TPH), Table per Type (TPT) and Table per Class (TPC).

The table-per-hierarchy method uses one database table in storage to maintain data for all the types in an inheritance hierarchy.

The table-per-type method uses a separate table in storage to maintain data for each type in the inheritance hierarchy. For example, such a mapping may include a table for a base type with columns for properties and a key column. As such, new columns may be added if new properties are added. Sub-types have a new table with new properties and a key column. Types and sub-types can be correlated by using the same key in each of the columns. Thus for example, a table may exist for type "animal", a table may exist for type "cat" and a table may exist for type "calico cat". A specific instance of a calico cat would have a row in all three tables, where each of the rows for the specific instance would have a matching key column entry.

The table per class method uses a separate table in storage to maintain data for each class.

Mapping specifications are used for an Object-Relational Mapping (or Conceptual-Relational/Conceptual-Conceptual Mapping) system. Solutions tend to be ad-hoc and thus narrowly applicable, complex and hard to use, and/or expensive and slow.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment is directed to facilitating translation of data between object oriented programs and database storage tables. A method includes receiving user input from a user. The user input includes a plurality of parts. Each part includes a specification of a source (such as a type source), optionally a filter, and a projection. Each projection assigns values to table columns. Based on the plurality of parts received, the method includes generating one or more views. The one or more views describe relationships between model extents and database tables. These views can then be used for various data mapping and table update functions.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments described herein use a mapping specification language which allows a developer to have greater control over how mapping from objects to database tables are performed, compilation of the mapping specification language to efficient runtime transformation functions and/or techniques for mapping validation. While the specification language is simple and intuitive, it is flexible enough to address a wide range of mapping patterns. Mappings describe a transformation of a function or query from entities or objects to database but tables. For example, mappings may be Table per Hierarchy (TPH), Table per Type (TPT) or Table per Class (TPC). Constraints on the operators available within the query allow compilation of the mapping specification into "views" appropriate for runtime data and query transformations. Note that these views are not typical database views, but rather describe model extents as functions of database tables or describe database tables as functions of model extents. Details regarding views are illustrated below and more fully in U.S. patent application Ser. Nos. 11/725,195 (Publication Number 20080228697) titled "View Maintenance Rules For An Update Pipeline Of An Object-Relational Mapping (ORM) Platform", filed Mar. 16, 2007, Ser. No. 11/725,206 (Publication Number 20070226196) titled "Mapping Architecture With Incremental View Maintenance", filed Mar. 16, 2007 and Ser. No. 11/724,991 (Publication Number 20070226203) titled Generation of Query And Update Views For Object Relational Mapping", filed Mar. 16, 2007 each of which are incorporated herein by reference in its entirety. As a side-effect of describing the mapping, a storage data model can be inferred for the developer.

As used herein, the term "entity" is used to describe an instance of a type in a user's application. An entity type is mapped to some target which is often a relational "table". The concepts described are relevant to mappings between other kinds of structure however. For instance, an 'entity' could be as simple as a collection of name-value pairs and a 'table' could be some arbitrary extent (for instance, another set of entities). An extent is generally a definable set with metes and bounds for inclusion in the set. For example, in an e-commerce enterprise relevant extents may be: the set of all customers; the set of all addresses; the set of all orders, etc.

Data Model

A data model is typically defined in the user application, such as in an object oriented application. The data model typically includes one or more of an entity type, a root entity type, an association type, and/or a complex type.

An entity type is a nominal type that optionally has a base type from which it derives (except in the case of a root entity type as will be described in more detail below). An entity type declares properties and inherits properties from its base type. The following illustrates categories of properties for an entity type. A primitive property is a property exposing an atomic or scalar value, for instance a string or a number. A complex property is a property returning an instance of a complex type. A navigation property is a property returning an instance or collection of entities. A navigation property is bound to a particular association type and end.

A root entity type is an entity type that does not have a base type, but itself may be a base type for other entity types. A base entity type declares one or more 'key' properties. Key properties are primitive properties uniquely defining an entity within an extent. For example, a key property may be a globally unique identifier (GUID), social security number, telephone number, or other unique identifier.

An association type defines a relationship between two entity types, referred to as 'ends' of the relationship. Each end has multiplicity of 'zero-or-one', 'one' or 'many', indicating the required number of related entities for the end. An association type may also define a referential constraint which indicates that two related entities share values for certain primitive properties. One end of the constraint is considered the 'principal' end and the other is the 'dependent' end. Constrained properties of the principal end are the key properties for that end.

A complex type is similar to an entity type, but with support for only primitive and complex properties and without support for type inheritance. A complex type does not have key properties.

Mapping Specification

A mapping is described as a function taking as arguments sets of entities and relationships and returning the contents of a table. Some embodiments may use a mapping specification language such that within an application, a separate mapping function is declared for each table. A mapping function comprises several "parts" each of which describes a source (e.g., "all entities of type X") and a range variable used to refer to instances of the entity (e.g., "e"); optionally a filter (e.g., "where e.Y==1"); and a projection (e.g., "select new {id=e.ID, y=e.Y}").

The source follows one of the following patterns: hierarchy type, single type, multiple type, or association. A hierarchy type indicates that the part applies to all entities that are instances of the given type or some type derived from the given type. A hierarchy type makes available a single range variable of the indicated type. A single type indicates that the part applies to all entities that are specifically instances of the given type, not derived from the given type. A single type makes available a single range variable of the indicated type. A multiple type indicates that the part applies to all entities implementing one of a set of types. A multiple type makes available a single range variable that is the most derived common ancestor for all of the types specified. An association indicates that the part applies to the given relationship. An association makes available two range variables, one for each side of the relationship.

A projection assigns values to table columns (zero or more assignments). Each assignment comprises a column name and a value, where the value follows one of the following patterns: a value literal, a property chain, a navigation key. A value literal indicates that for the given source and filter, the specified column has the given constant value. A property chain is a member access chain where the leaf is the entity or range variable, intermediate members are complex properties and ending with a primitive property. A navigation key is a member access chain comprising a navigation property on the range variable and a key property of the related end.

A filter (not available for relationship sources) is some function of the entity range variable returning a Boolean value and indicating the subset of the source to which the mapping part applies. The filter comprises logical operators (e.g. 'AND', 'OR', 'NOT' 'NAND', 'NOR', and 'XOR') and simple comparisons (e.g. $>$, $>=$, $==$, $<=$, $<$) between property chains and value literals.

A relationship mapping permits 'simple' property chains comprising relationship end range variable and a key property for the corresponding end.

Notably, for an application, typically several mapping functions will be defined in a specification for the application. A mapping function can be, but is not necessarily, defined for each table in a database. Mapping functions can be defined for existing tables to facilitate the translation of data from applications to databases, or mappings can be defined for tables that should be created to accomplish the translation of data from applications to databases.

Embodiments may also be implemented whereby mapping functions are created for different kinds of data. However, mappings do not necessarily need to be defined in every embodiment. Rather, in some embodiments, a mapping specification may be deduced by deducing table and key constraints.

Sample API

Figure 1:
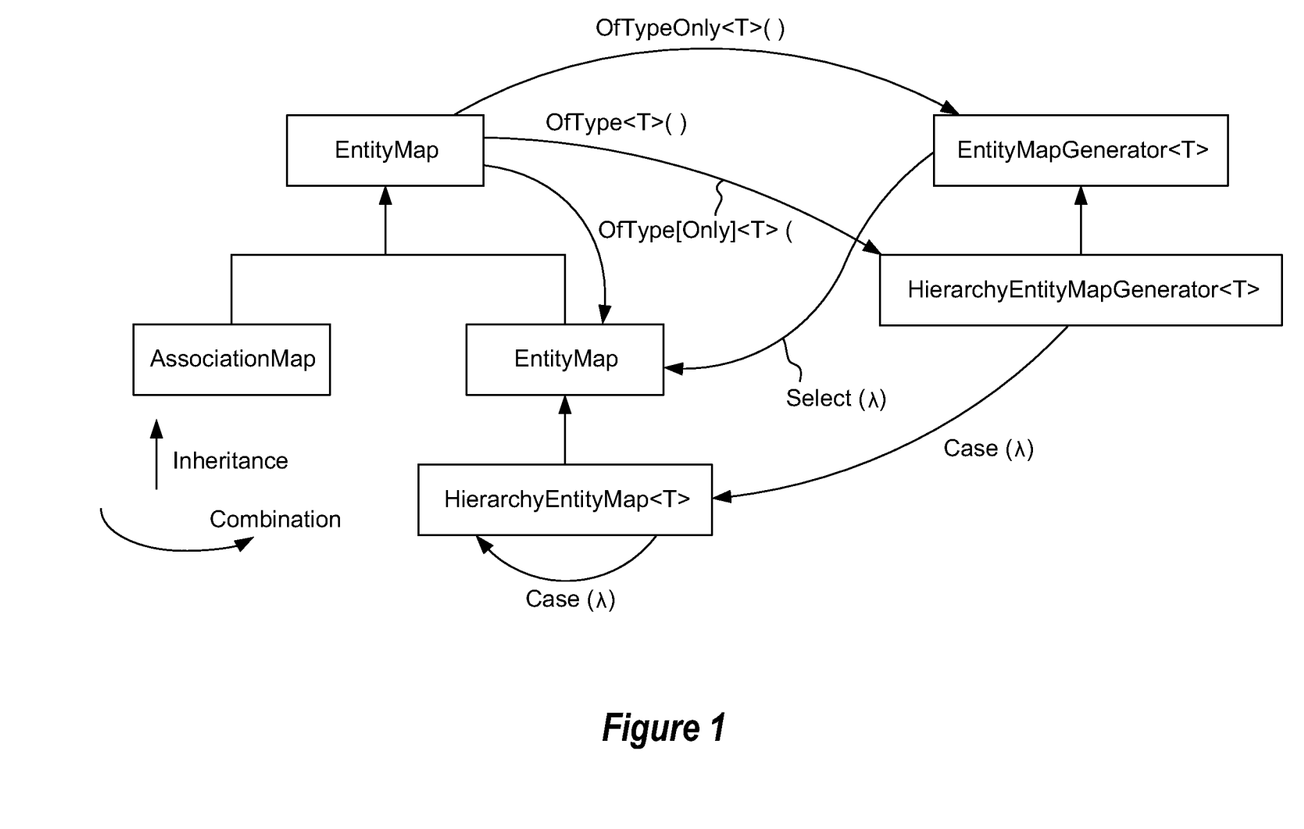
FIG. 1 illustrates an example API that may be used for a mapping specification.

This section describes one embodiment of an application programming interface (API) realization of the mapping specification described above. This API specifically targets C#3.0 or VB 9.0, but is appropriate for any language with support for lambda expressions. A graphical representation of the API is illustrated in FIG. 1.

The mapping classes used in one embodiment are described below:

```
public abstract class Map
{
    internal Map( );
    public static EntityMap OfType<TEntity>(
        Expression<Func<TEntity, object>> propertyMap);
    public static EntityMap OfTypeOnly<TEntity>(
        Expression<Func<TEntity, object>> propertyMap);
    public static HierarchyEntityMapGenerator<TEntity>
        OfType<TEntity>( );
    public static EntityMapGenerator<TEntity>
        OfTypeOnly<TEntity>( );
}
// Constructed by EntityConfiguration<TEntity>.MapNavigation
public sealed class AssociationMap : Map
{
    internal AssociationMap( );
    public override string ToString( );
}
public class EntityMap : Map
{
    internal EntityMap( );
    // displays contents of mapping
    public override string ToString( );
    public EntityMap Union(EntityMap other);
}
// exists only as a fluent 'bridge'
// (the user calls Select to use the mapping)
public class EntityMapGenerator<TEntity>
{
    internal EntityMapGenerator( );
    public EntityMap Select(
        Expression<Func<TEntity, object>> propertyMap);
}
// exists only as a fluent 'bridge'
// (the user calls Select or Case to use the mapping)
public sealed class HierarchyEntityMapGenerator<TEntity> :
        EntityMapGenerator<TEntity>
{
    internal HierarchyEntityMapGenerator( );
    public HierarchyEntityMap<TEntity> Case<TSub>(
        Expression<Func<TSub, object>> propertyMap
    ) where TSub : TEntity;
}
public sealed class HierarchyEntityMap<TEntity> : EntityMap
{
    internal HierarchyEntityMap( ) { }
    public HierarchyEntityMap<TEntity> Case<TSub>(
        Expression<Func<TSub, object>> propertyMap
    ) where TSub : TEntity;
}
```

Case Shorthand

As illustrated above, the API includes a Case method. The Case method allows for a shorthand specification of Table Per Hierarchy (TPH) mappings, or other mappings where a single table is explicitly partitioned by type. The shorthand avoids the need to repeat mapping information for each type that is mapped to a table by allowing column mappings and conditions to be inherited. The following simple example is used as illustration:

```
class Toy { int ID; int Rating; }
abstract class AnimalToy : Toy { string Name; }
class SeaAnimalToy : AnimalToy { bool IsMammal; }
class DeviceToy : Toy { bool IsCar; }
```

```
Map.OfType<Toy>( )
    .Case<Toy>(t => new { tid = t.ID, rating = tRating, disc = "Toy" })
    .Case<AnimalToy>(t => new { tname = t.Name })
    .Case<SeaAnimalToy>(t => new { ismammal = t.IsMammal,
        rating2 = t.Rating, disc = "SeaAnimal" })
    .Case<DeviceToy>(t => new { iscar = t.IsCar, disc = "IsCar" });
```

The Case specification is transformed into an explicit mapping function using the following process. First, an (initially empty) OfTypeOnlyfragment is created for every concrete type including a case statement, e.g.:

```
Map.OfTypeOnly<Toy>(...).Union(
Map.OfTypeOnly<SeaAnimalToy>(...)).Union(
Map.OfTypeOnly<DeviceToy>(...));
```

Abstract types are not represented, since they only contribute to concrete partitions via inheritance. (An exception is thrown if there is a Case for an abstract type but no subtypes are included). Next each, partition is filled in to include mappings explicitly declared for the type. Consider the SeaAnimalToy type:

```
...
Map.OfTypeOnly<SeaAnimalToy>(t => new {
    ismammal = t.IsMammal,
    rating2 = t.Rating,
    disc = "SeaAnimal"
})
...
```

Code-Only then walks up the type hierarchy to find additional mapping information. The first type explored is the base type AnimalToy, which also includes a mapping detail:

```
...
    tname = t.Name,
...
```

Finally, the Toy mapping information is incorporated:

```
...
    tid = t.ID,
...
```

Two elements of this last mapping are ignored because they have already been specified. The 'disc' column has been overridden in the SeaAnimalToy fragment, as has the 'Rating' property. Intuitively, the Case shorthand can be viewed as introducing inheritance of column and property mappings with overrides.

The following method overload is added to support this feature:

```
class EntityMap<TEntity>
{
    ...
    public EntityMap<TEntity>
Case<TDerived>(Expression<Func<TDerived, object>>propertyMap)
where TDerived : TEntity;
}
```

Mapping Validation

The following discussion now discusses mapping validation. Two concepts discussed in this section are now described. The first is the notion of 'model profile'. The second is the notion of 'table profile'. In the simplest case, these concepts map to an 'extent' (i.e. a set of instances of a type) and a 'table' respectively. However, a particular mapping function part may be associated with a narrow 'model profile' or 'table profile'.

The model profile is defined as follows: The set of types to which the part applies (a hierarchy part applies to all types within a given inheritance hierarchy, a single type part applies to a single type, and a multiple type part applies to a set of types). Type in $\{t_1, t_2, \ldots\}$. Where the part includes a filter, the predicate is also incorporated into the profile. For every property path participating in a filter predicate, the domain of the property is discretized according to the values with which the path is compared (across all parts). For instance, given the filter clauses e.X==1 and e.X<2, the domain for e.X is discretized as follows: e.X in {'.<1', '1', '1<.<2', '2', '2'} and the filter clauses are rewritten as e.X in {'1'} and e.X in {'.<1', '1', '1<.<2'}. This representation of the filter clauses facilitates validation logic. Note that some types have small domains (e.g., enums and Boolean). In such cases, the domain is already practically discrete and the intrinsic domain can be used.

The model profile for a part is therefore represented as a constraint expression, e.g.:

```
builder.Entity<A>( ).MapSingleType(a => new { id = a.id, disc = "A" })
    .Where(a =>a.Category == Category.Foo)
    .ToTable("dbo.Foo")
``` has the following model profile:
Type in {A} AND a.Category in {Category.Foo}

Each function part is also associated with a 'table profile' which captures the following information: (1) The table. (2) The range of possible values for each column in the table given the part. Where the column is assigned a literal, the range is C in {value}. For unmapped columns, the range is C in {null}. Where the column is assigned a nullable property, the range is C in Domain union {null}. Otherwise, the range is C in Domain.

The above example has the following table profile (assuming columns id, disc and x):

```
Table in { "dbo.Foo" } AND id in Domain except { null } AND disc in { "A" } AND x in { null }
```

Mapping validation may demonstrate the correctness (or "roundtrippability") of its mappings. Roundtripability refers to the ability to translate data and queries between object systems and table storage systems. This is further clarified below in the sections discussing view creation. Mapping validation demonstrates the correctness (or "roundtrippability") of its mappings by verifying one or more of the following: (1) Consistency of association mappings. This verification demonstrates consistency of relationship mappings. (2) Disjointness in the model. This verification demonstrates that each pair of function parts mapped to a particular table have disjoint model profiles. While this is not strictly necessary, it makes propagation and validation algorithms considerably simpler. (3) Disjointness in the table. This verification demonstrates that each pair of function parts mapped to a particular table have disjoint table profiles. While this is not strictly necessary, it makes propagation and validation algorithms considerably simpler. (4) Completeness of mapping. This verification ensures that each property (declared and inherited) of each concrete type is mapped for all possible model profiles over the type. This also implies verification that each concrete type is mapped. (5) Type roundtripping. This verification ensures that each concrete type has a unique set of table profiles.

These verifications can help to ensure that entity or relationship instances can be stored with full fidelity in the database. Each of these will now be discussed in more detail.

Consistency of Association Mappings

Inline Mappings

This section assumes that the model treats relationships as independent of entities. Where the relationship is part of the entity in the data model (i.e. the entity holds the key of a related entity) this step is unnecessary: the inline mapping can be treated like any other required property path.

In Code-Only, function parts may include column maps with navigation paths. Consider the following example:

```
abstract class A { int ID; int X; D D; }
class B : A { int Y; }
class C : A { int Z; }
class D { int ID; }
```

The navigation property A.D may be mapped as follows:

```
builder.Entity<B>( ).MapSingleType(b => new { b.ID, b.X, b.Y,
    DID =
b.D.ID }).ToTable("dbo.A");
    builder.Entity<C>( ).MapSingleType(c => new { c.ID, c.X, c.Z,
    DID =
c.D.ID }));
```

While these column maps are inline in the specification, the mapping is independent for the data access runtime. Some validation of navigation mappings is performed before they are transformed into association set mappings. For example, the following illustrates two validation constraints.

(1) Take the base declaring type for the navigation property that is being mapped inline. Each concrete type in the hierarchy for this declaring type includes an inline mapping for the navigation property. Note that a single hierarchy function part may satisfy this requirement for several types in the hierarchy.

(2) Each inline mapping of the navigation property includes all key properties of the target entity. In addition, each inline mapping is consistent with respect to the columns and tables into which those key values are projected.

Given these constraints, a single association mapping can be generated that holds for the entire entity type hierarchy.

Join Table Mappings

When the user specifies a relationship mapping function via Relationship.Map (in the example illustrated), embodiments may ensure that the join table is mapped only to the association.

Disjointness in the Model and the Table

For a particular table, this verification ensures that each entity function part is disjoint in the model. In particular, two parts cannot "contain" the same concrete entity types. For instance, the following mapping using the classes defined above:

```
builder.Entity<A>( ).MapHierarchy(a => { a.ID, a.X
}).ToTable("dbo.same");
builder.Entity<B>( ).MapSingleType(b => { b.ID, b.Y
}).ToTable("dbo.same");
``` is not legal because both the first and second parts 'contain' the concrete type B. To determine if two function parts are disjoint, an entailment algorithm (e.g., generalized Binary Decision Diagrams) can be used to determine if the model profiles ($P_1$ and $P_2$) for the parts are different. The algorithm can be used to prove that:

$$P_1 \rightarrow NOT\ P_2$$

and $$P_2 \rightarrow NOT\ P_1$$

Similarly, the parts have disjoint table profiles.

Completeness of Mapping

For completeness of mapping verification, every property of every concrete type in every entity set is mapped somewhere. Each part of a complex type property is mapped as well. For purposes of this check, some embodiments examine a flattened representation of the entity type where complex properties are expanded into their leaf, or 'primitive property', components. Embodiments then walk through each function part and aggregate a model profile for each property for each property as it is encountered. The pseudo-code is shown below:

```
coverage ← map from each property path to null
foreach (part in functionParts)
    foreach (propertyPath in GetPropertyPaths(part))
        existingProfile ← coverage[propertyPath]
        profile ← GetModelProfile(part)
        if (existingProfile == null)
            coverage[propertyPath] ← profile
        else
            coverage[propertyPath] ← profile OR existingProfile
```

At the end of this process, the profile for each property path covers the entire domain of possible values for the relevant type hierarchy. Coverage can be demonstrated using a logical entailment algorithm.

The following illustrates handling when incomplete mappings are detected. The above process can be used to determine which entity configurations (model profiles) are not supported by the mapping. Rather than rejecting the mapping, it is possible to add checks at runtime to ensure that a particular entity instance has a supported profile before attempting to save it to database tables.

Type Roundtripping

To perform type roundtripping verification, each concrete entity type is associated with a unique set of table profiles. This allows embodiments to reliably determine the type for data contained in the database.

View Generation

This section describes method acts used to transform mapping function parts into mapping views. Two different views will be discussed: (1) query mapping views and update mapping views. As noted, the views are not views in the traditional database context. View mapping is described in detail in U.S. patent application Ser. Nos. 11/725,195 (Publication Number 20080228697) titled "View Maintenance Rules For An Update Pipeline Of An Object-Relational Mapping (ORM) Platform", filed Mar. 16, 2007, Ser. No. 11/725,206 (Publication Number 20070226196) titled "Mapping Architecture With Incremental View Maintenance", filed Mar. 16, 2007 and Ser. No. 11/724,991 (Publication Number 20070226203) titled Generation of Query And Update Views For Object Relational Mapping", filed Mar. 16, 2007, each of which is incorporated herein by reference in their entireties.

Query mapping views (QMV) describe model extents as functions of database tables. In particular, a QMV describes the construction of an extent, and in particular how to create an extent given the contents of tables. A QMV can be used to rewrite model queries as queries over tables. The process involves replacing extent references in a query with the corresponding QMV.

Update mapping views (UMV) describe database tables as functions of model extents. UMV can be used to rewrite update, delete and insert operations against model extents as operations against database tables. This process involves propagating "delta" operations across the UMV using adapted incremental view maintenance algorithms. In particular, a UMV can be used to propagate modifications of extents to modifications to database tables.

The following illustrates an example algorithm that can be used to construct QMV given a collection of mapping function parts:

```
GenerateQMV(extent)
parts ← all function parts for the extent
qmvComponents ← { }
foreach table in all tables referenced in parts
    tableParts ← all parts referencing table
    // Gather function parts related to an extent
    // Group function parts according to table targeted in
the database
    // From validation, it is known that all table parts are
disjoint.
    // As such, the contribution of this table to the extent
is the concatenation
    // (UNION ALL in SQL) of those parts. A consistent
mapping of keys means that
    // this concatenation produces records including well-
known key fields.
    // A reserved sentinel field is added indicating the
function part introducing
    // each element.
    qmvComponents ← qmvComponents + { concat all tableParts }
// From validation, it is known that each component has well-
known key fields.
```

-continued

```
// Perform an outer join on key fields to gather together all
contributing fields for
// each entity as partitioned by key values.
viewData ← full outer join of all qmvComponents
// Using the sentinel fields, determine which type each row
produces based on
// the unique profiles for each type (uniquesness of profiles
is ensured by validation)
view ← AddDiscriminatingProjection(viewData)
return view
```

The view is then simplified (turning full outer joins into joins where possible, lifting unions, etc.). The simplification process is disclosed in more detail in U.S. patent application Ser. Nos. 11/725,195 (Publication Number 20080228697) titled "View Maintenance Rules For An Update Pipeline Of An Object-Relational Mapping (ORM) Platform", filed Mar. 16, 2007, Ser. No. 11/725,206 (Publication Number 20070226196) titled "Mapping Architecture With Incremental View Maintenance", filed Mar. 16, 2007 and Ser. No. 11/724,991 (Publication Number 20070226203) titled Generation of Query And Update Views For Object Relational Mapping", filed Mar. 16, 2007 previously incorporated herein by reference in their entireties.

An algorithm is used to generate QMV for independent association extents. Since validation verifies that key properties of association ends are consistently mapped, the view is simply a projection of the relevant keys from the relevant table. A filter is sometimes used to filter out rows that do not contain a relationship, specifically a "not null" filter where key columns may be null.

The following illustrates a sample algorithm that can be used to construct UMV given a collection of mapping function parts:

```
GenerateUMV(table)
   parts ← all function parts for the table
   extent ← determine single extent mapped to the table (ensured
   by validation)
   // Within a table, each part is disjoint (ensured by
   validation). As a result, embodiments can
   // produce a switch that applies function part predicates to
   each element of the
   // extent and applies the corresponding projection for the
   first matching function
   // part.
   switch ← AddSwitchProjection(extent)
   return view
```

Propagation

Column Configuration

Table definitions are built up implicitly based on the model and mapping. Whenever a mapping part is processed it contributes to system knowledge of the table shape in the following ways: (1) Which columns exist in the table. Each part may introduce new columns (2) Type constraints/facets. A property in the model may be decorated with various facets such as max length, encoding, etc. This information propagates to the columns to which the properties are mapped. Where a column is mapped to multiple properties, inconsistencies may arise (such as inconsistencies related to, encoding, data types or size) in which case an error is returned. In some cases, multiple contributing parts may 'widen' the allowed values for a column. For example, the physical structure of a column may be widened, such as the actual width of a column, or the types of data that may be entered into a column may be widened, such as for example by allowing floating points, integers, strings, etc in the same column, or by allowing different encodings.

Constraints

Columns mapped to key properties become keys in the table. Inconsistent key mappings may result in errors. Foreign key constraints are introduced wherever the model and its mapping to the database implies a dependency. The following cases are handled: (1) Model profile constraints: each table has a particular model profile (the disjunction of all model profiles for function parts referring to the table). If one table has a model profile that is a proper subset of another table's profile ($P_{sub} \rightarrow P_{super}$ and NOT ($P_{super} \rightarrow P_{sub}$)), a primary key (PK) to primary key foreign key (FK) constraint can be added. (2) Relationship constraints: where a table includes a mapping for a relationship, an FK constraint can be added from each end in the mapping to the PKs of all tables where the end type is entirely contained in the profile. (3) Foreign key constraints: if the model includes a foreign key constraint, each column mapping the dependent property may also have a constraint to the PKs of all tables where the end type is entirely contained in the profile.

Constraints are 'pruned' so that a constraints that are redundant given two other constraints are removed. In one embodiment, this operation is performed using a proper subset graph over the tables. The vertices in the "subset" graph represent tables and a directed edge exists between two vertices whenever the first table maps a proper subset of the second table's entities. The graph is then pruned using the following algorithm:

Initialize an empty "pruned" graph.
For each node "predecessor" in the "subset" graph:
   Initialize an empty set of "reachable" nodes (nodes that can be reached from the current predecessor)
   Consider each "successor" to "predecessor". Successors are explored from "deepest" to "shallowest": the successor that itself has the largest number of successors is explored first.
     1. If the "successors" is not yet in the "reachable" set, add an edge from "predecessor" to "successor" in "pruned" graph. Also, add "successor" and its successors to the "reachable" set to ensure that a redundant edge is not added later.

The "pruned" graph can then be leveraged in a number of different ways. For example, "Model profile constraints" are only preserved when a corresponding edge appears in the "pruned" graph. Additionally The smallest set of parent/referenced tables required to represent "relationship constraints" and "foreign key constraints" can be determined using the following simple algorithm:

Determine the set of candidate parent tables (as described above) "candidates".
Initialize an empty set of "reachable" nodes.
Initialize an empty set of "parents".
Consider each "candidate" from "deepest" to "shallowest".
If the "candidate" is not yet in the "reachable" set, add it to the "parents" set. Also, add the "candidate" and its successors to the "reachable" set.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 2:
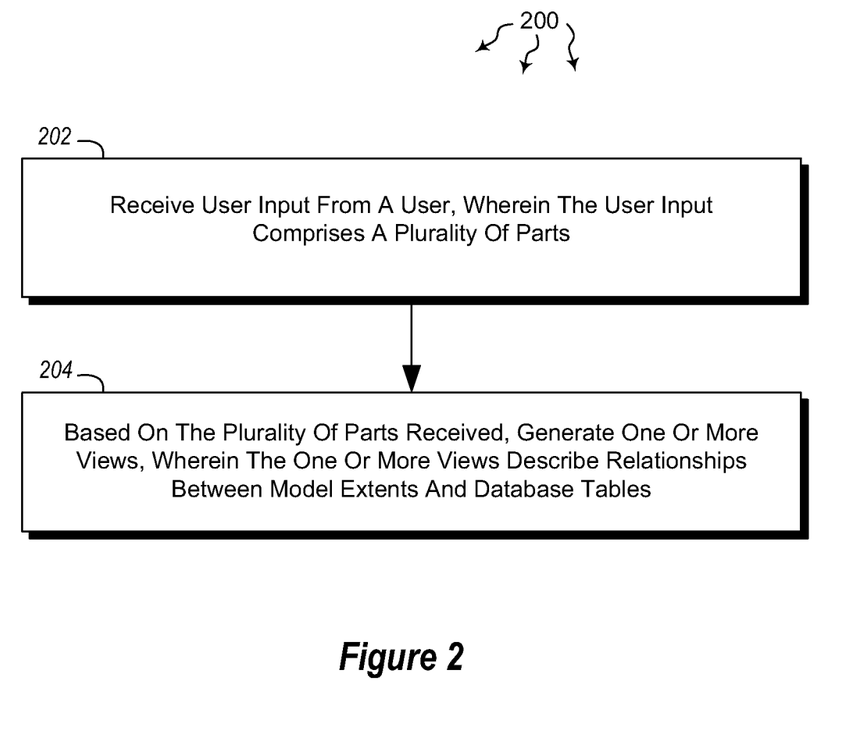
FIG. 2 illustrates a method of facilitating translation of data between object oriented programs and database storage tables.

One embodiment may be a method practiced in a computing environment. The method includes acts for facilitating translation of data between object oriented programs and database storage tables. The method includes receiving user input from a user, wherein the user input comprises a plurality of parts (act 202). Each part includes a specification of a source, optionally a filter, and a projection. Each projection assigns values to table columns. Based on the plurality of parts received, the method 200 includes generating one or more views, wherein the one or more views describe relationships between model extents and database tables (act 204).

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a method of facilitating mapping of data between object oriented programs and database storage tables, the method comprising:
receiving user input from a user, wherein the user input comprises a plurality of parts, wherein each part comprises:
a specification of a source, wherein the specification of a source comprises specification of at least one of a hierarchy type, a single type, a multiple type, or an association type, wherein a hierarchy type indicates that a part applies to all entities that are instances of the given type or some type derived from the given type, further wherein a hierarchy type makes available a single range variable of the indicated type; and wherein a single type indicates that a part applies to all entities that are specifically instances of the given type, not derived from the given type, further wherein, a single type makes available a single range variable of the indicated type, further wherein a multiple type indicates that the part applies to all entities implementing one of a set of types, and wherein a multiple type makes available a single range variable that is a most derived common ancestor for all of the types specified, further wherein an association type indicates that a part applies to a given relationship, and wherein an association type makes available two range variables, one for each side of a relationship; and a projection, wherein each projection assigns values to table columns including zero or more assignments, each assignment comprising a column name and a value, where the value follows one of the following patterns: a value literal, a property chain, a navigation key, wherein a value literal indicates that for a given source and optional filter, a specified column has a given constant value, further wherein a property chain is a member access chain where a leaf is an entity or range variable, intermediate members are complex properties and ending with a primitive property, further wherein a navigation key is a member access chain comprising a navigation property on a range variable and a key property of a related end;

performing inline mapping validation, including:
determining a base declaring type for the navigation property that is being mapped inline, wherein each concrete type in a hierarchy for this declaring type includes an inline mapping for the navigation property; and
determining that each inline mapping of the navigation property includes all key properties of the target entity and that each inline mapping is consistent with respect to columns and tables into which those key values are projected; and based on the plurality of parts received, generating one or more views, wherein the one or more views describe relationships between model extents and database tables.

2. The method of claim 1, wherein one or more of the parts comprises one or more filters, wherein each filter is a function of an entity range variable returning a Boolean value and indicating a subset of the source to which a part applies, wherein the filter comprises logical operators and comparisons between property chains and value literals.

3. The method of claim 1, wherein generating one or more views comprises generating one or more views that describe model extents as functions of database tables.

4. The method of claim 3, further comprising using one or more views that describe model extents as functions of database tables to rewrite model queries as queries over tables.

5. The method of claim 1, wherein generating one or more views comprises generating one or more views that describe database tables as functions of model extents.

6. The method of claim 5, further comprising using one or more views that describe database tables as functions of model extents to propagate modifications of extents to modifications of database tables.

7. The method of claim 1, further comprising performing join table mapping validation, including ensuring that a table is mapped only to an association.

8. The method of claim 1, further comprising performing disjoint model and table validation to ensures that each entity function part is disjoint in the model in that two parts do not contain the same concrete entity types.

9. The method of claim 1, further comprising performing completeness of mapping validation ensuring that every property of every concrete type in every entity set is mapped somewhere and that each part of a complex type property is mapped.

10. The method of claim 9, wherein performing completeness of mapping validation comprises examining a flattened representation of an entity type where complex properties are expanded into their leaf components and walking through each function part and aggregating a model profile for each property for each property as it is encountered.

11. The method of claim 9, further comprising, detecting an incomplete mapping and as a result adding checks at runtime to ensure that a particular entity instance has a supported profile before attempting to save the entity instance to database tables.

12. The method of claim 1, further comprising performing type roundtripping validation by verifying that each concrete entity type is associated with a unique set of table profiles.

13. The method of claim 1, further comprising, based on the one or more generated views, implicitly building up table definitions including defining table shape with respect to which columns exist in the table and property facets, which are propagated to columns to which properties are mapped.

14. The method of claim 13, further comprising returning an error when inconsistencies arise for a table column due to a column being mapped to multiple properties.

15. The method of claim 13, further comprising widening allowed values for a column as a result of multiple parts contributing to a column.

16. The method of claim 13, further comprising introducing foreign key constraints onto table columns as a result of a mapping to a database implying a dependency.

17. The method of claim 16, further comprising pruning foreign key constraints to remove any foreign key constraint that is redundant given two or more other constraints.

18. In a computing environment, a computer readable storage memory comprising computer executable instructions that when executed by one or more processors causes one or more processors to perform the following:

receiving user input from a user, wherein the user input comprises a plurality of parts, wherein each part comprises:
a specification of a source, wherein the specification of a source comprises specification of at least one of a hierarchy type, a single type, a multiple type, or an association type, wherein a hierarchy type indicates that a part applies to all entities that are instances of the given type or some type derived from the given type, further wherein a hierarchy type makes available a single range variable of the indicated type; and wherein a single type indicates that a part applies to all entities that are specifically instances of the given type, not derived from the given type, further wherein, a single type makes available a single range variable of the indicated type, further wherein a multiple type indicates that the part applies to all entities implementing one of a set of types, and wherein a multiple type makes available a single range variable that is a most derived common ancestor for all of the types specified, further wherein an association type indicates that a part applies to a given relationship, and wherein an association type makes available two range variables, one for each side of a relationship; and a projection, wherein each projection assigns values to table columns including zero or more assignments, each assignment comprising a column name and a value, where the value follows one of the following patterns: a value literal, a property chain, a navigation key, wherein a value literal indicates that for a given source and optional filter, a specified column has a given constant value, further wherein a property chain is a member access chain where a leaf is an entity or range variable, intermediate members are complex properties and ending with a primitive property, further wherein a navigation key is a member access chain comprising a navigation property on a range variable and a key property of a related end;

performing inline mapping validation, including:

determining a base declaring type for the navigation property that is being mapped inline, wherein each concrete type in a hierarch for this declaring type includes an inline mapping for the navigation property; and determining that each inline mapping of the navigation property includes all key properties of the target entity and that each inline mapping is consistent with respect to columns and tables into which those key values are projected; and based on the plurality of parts received, generating one or more views, wherein the one or more views describe relationships between model extents and database tables.

19. In a computing environment, a computing system comprising a computer readable memory and one or more processors, wherein the computer readable memory comprises computer executable instructions that when executed by one or more of the processors, causes one or more of the processors to perform the following:

receiving user input from a user, wherein the user input comprises a plurality of parts, wherein each part comprises:

a specification of a source, wherein the specification of a source comprises specification of at least one of a hierarchy type, a single type, a multiple type, or an association type, wherein a hierarchy type indicates that a part applies to all entities that are instances of the given type or some type derived from the given type, further wherein a hierarchy type makes available a single range variable of the indicated type; and wherein a single type indicates that a part applies to all entities that are specifically instances of the given type, not derived from the given type, further wherein, a single type makes available a single range variable of the indicated type, further wherein a multiple type indicates that the part applies to all entities implementing one of a set of types, and wherein a multiple type makes available a single range variable that is a most derived common ancestor for all of the types specified, further wherein an association type indicates that a part applies to a given relationship, and wherein an association type makes available two range variables, one for each side of a relationship;

one or more filters, wherein each filter is a function of an entity range variable returning a Boolean value and indicating a subset of the source to which a part applies, wherein the filter comprises logical operators and comparisons between property chains and value literals; and a projection, wherein each projection assigns values to table columns including zero or more assignments, each assignment comprising a column name and a value, where the value follows one of the following patterns: a value literal, a property chain, a navigation key, wherein a value literal indicates that for a given source and optional filter, a specified column has a given constant value, further wherein a property chain is a member access chain where a leaf is an entity or range variable, intermediate members are complex properties and ending with a primitive property, further wherein a navigation key is a member access chain comprising a navigation property on a range variable and a key property of a related end;

based on the plurality of parts received, generating one or more views, wherein the one or more views describe relationships between model extents and database tables;

based on the one or more generated views, implicitly building up table definitions including defining table shape with respect to which columns exist in the table and property facets, which are propagated to columns to which properties are mapped;

introducing foreign key constraints onto table columns as a result of a mapping to a database implying a dependency; and pruning foreign key constraints to remove any foreign key constraint that is redundant given two or more other constrains, wherein pruning foreign key constraints comprises using a subset graph over tables, wherein vertices in the subset graph represent tables and a directed edge exists between two vertices whenever a first table maps a proper subset of a second table's entities, pruning the graph comprising:

initializing an empty pruned graph;

for each node predecessor in the graph:

initializing an empty set of reachable nodes which are nodes that can be reached from a current predecessor; and for each successor to the current predecessor, if the successor is not yet in a reachable set, add an edge from the current predecessor to the successor in the pruned graph and add the successor and its successors to the reachable set to ensure that a redundant edge is not later added.

* * * * *